United States Patent [19]

Aihara et al.

[11] Patent Number: 4,977,862
[45] Date of Patent: Dec. 18, 1990

[54] ENGINE ROOM-COOLING CONTROL SYSTEM

[75] Inventors: Yasuyuki Aihara; Shuji Katoh; Shigeki Baba; Eitetsu Akiyama, all of Wako, Japan

[73] Assignee: Honda Giken Kogyo Kabushiki Kaisha, Tokyo, Japan

[21] Appl. No.: 290,179

[22] Filed: Dec. 23, 1988

[30] Foreign Application Priority Data

Dec. 28, 1987 [JP] Japan .................. 62-199408[U]
Jun. 3, 1988 [JP] Japan ................... 63-138075

[51] Int. Cl.$^5$ .................................. F01P 7/02
[52] U.S. Cl. ............................ 123/41.12; 123/41.15
[58] Field of Search ............... 123/41.12, 41.15, 41.31, 123/41.44, 41.49, 41.65, 41.66, 198 D, 563; 374/1

[56] References Cited

U.S. PATENT DOCUMENTS

| | | | |
|---|---|---|---|
| 3,893,108 | 7/1975 | McBride, Jr. et al. | 123/198 D |
| 4,409,933 | 10/1983 | Inoue | 123/41.12 |
| 4,475,485 | 10/1984 | Sakakibara et al. | 123/41.12 |
| 4,513,695 | 4/1985 | Patchen | 123/563 |
| 4,580,531 | 4/1986 | N'Guyen | 123/41.12 |
| 4,590,892 | 5/1986 | Nose et al. | 123/41.12 |
| 4,608,827 | 9/1986 | Hasegawa et al. | 123/41.31 |

FOREIGN PATENT DOCUMENTS 55-34101 8/1980 Japan .
57-191415 11/1982 Japan .

Primary Examiner—Noah P. Kamen
Attorney, Agent, or Firm—Lyon & Lyon

[57] ABSTRACT

In a cooling control system for controlling cooling of an engine room of an engine, a water pump and/or cooling fans are arranged within the engine room to cool same, and electric motors electrically drive the water pump and cooling fans. A control unit compares a temperature of the engine detected by a temperature sensor with a plurality of different predetermined values, and based upon results of the comparison, controls the electric motors for driving the cooling fans in such a manner that as the detected temperature is higher, the flow rate of cooling air flowing in the engine room is larger. The control unit is operable when abnormality occurs in sensors for sensing operating conditions of the engine, for operating the electric motors to drive the water pump and cooling fans. Alternatively, an analog circuit is operable when abnormality occurs in the control unit, for operating the electric motors to drive the water pump and the cooling fans.

11 Claims, 10 Drawing Sheets

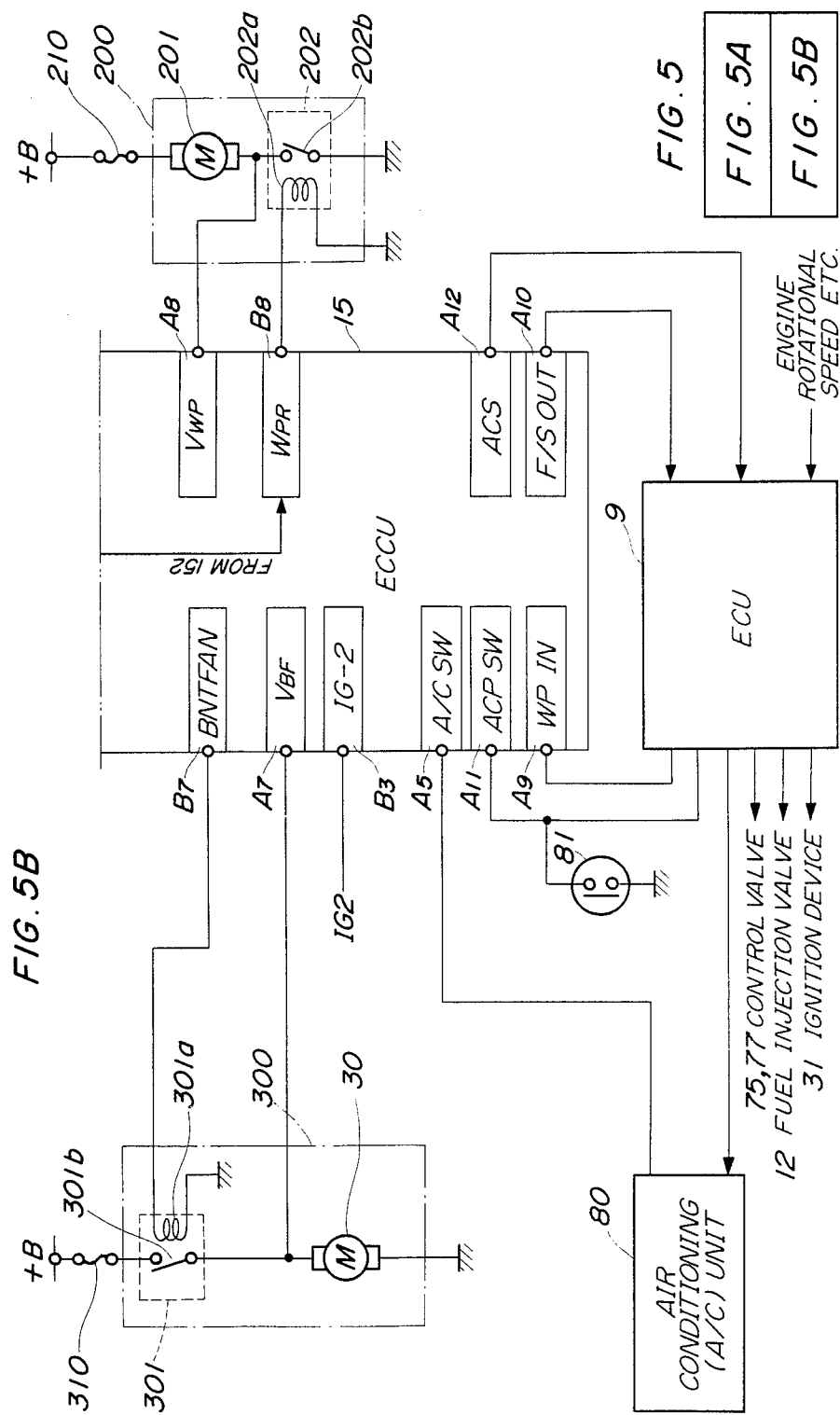

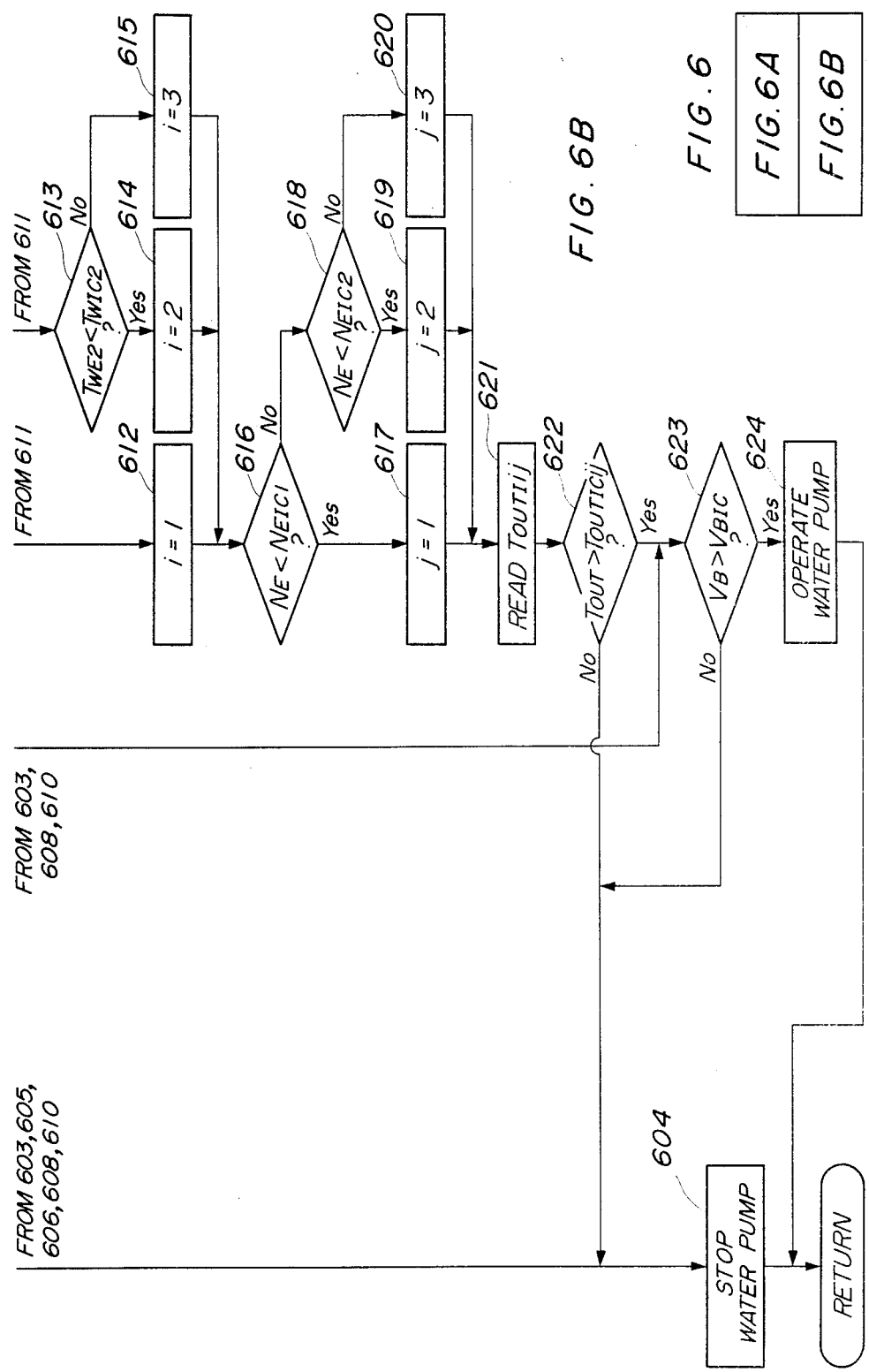

FIG. 7

| j=3 | | $T_{OUTIC13}$ | $T_{OUTIC23}$ | $T_{OUTIC33}$ |
|---|---|---|---|---|
| | $N_{EIC2}$ | | | |
| j=2 | | $T_{OUTIC12}$ | $T_{OUTIC22}$ | $T_{OUTIC32}$ |
| | $N_{EIC1}$ | | | |
| j=1 | | $T_{OUTIC11}$ | $T_{OUTIC21}$ | $T_{OUTIC31}$ |

$T_{WIC1}$   $T_{WIC2}$ i=1   i=2   i=3

ENGINE ROOM-COOLING CONTROL SYSTEM

BACKGROUND OF THE INVENTION

This invention relates to an engine room-cooling control system which is adapted to control temperature within an engine room in an improved manner by means of cooling means provided in the engine room.

Conventionally, as a system for cooling the engine room of an automotive vehicle, a ventilating system has been proposed by Japanese Utility Model Publication (Kokoku) No. 55-34101, which comprises an electric fan which is mounted on a bonnet, etc. for auxiliary ventilating purposes and is driven to operate and stop depending on the engine room temperature or the engine coolant temperature, so that the engine room temperature is maintained at such a suitable temperature as to prevent overheating of the engine, vapor locking of fuel, and other thermal damage to the engine.

However, the proposed control system is adapted to merely operate and stop the electric fan depending on whether the temperature within the engine room or the temperature of the engine per se is higher than a predetermined value. As a result, it is difficult to control the electric fan to operate just to a degree sufficient to exactly bring the engine room temperature to a required value. For instance, the electric fan may be driven to an excessive degree for prevention of thermal damage, which may result in excessive exhaustion of a battery which supplies power to the electric fan.

Further, cooling control systems have been conventionally known, which comprise a second control system provided in addition to a control system for controlling the engine per se, the second control system controlling the operation of a cooling device for cooling the engine, in response to outputs from sensors for detecting operating conditions of the engine, so as to cool the engine to a sufficient degree while preventing an excessive rise in the engine temperature, to thereby secure proper operation of the engine as well as to prevent the engine and its auxiliary equipments from being shorten in life. One of such cooling control systems have been proposed by Japanese Provisional Patent Publication (Kokai) No. 57-191415, which comprises an electric fan which is operable in the event of failure of the above-mentioned sensors, drive means for driving a water pump as the cooling device, or the control system, to deliver cooling air to the engine so as to prevent an excessive rise in the temperature thereof.

However, the proposed cooling control system essentially requires the provision of an exclusive electric fan for use only in the event of failure of the sensors, etc., and thus is disadvantageous in that the system is high in manufacturing cost, and large in size.

Furthermore, in the above-mentioned conventional cooling control systems the water pump and the electric fan are disposed to cool the engine alone. Therefore, if they are used in an engine equipped with a turbocharger, for example, they are unable to prevent an excessive rise in the temperature of the turbocharger. Besides, the turbocharger forms one of main heat sources within the engine room, so that an excessive rise in the temperature of the engine due to increased temperature of the turbocharger cannot be prevented, thereby being unable to secure proper operation of the engine and a sufficient life of the engine.

Still further, in the conventional cooling control systems the electric fan is disposed to deliver cooling air directly to the engine to cool same, but not to deliver cooling air to a radiator in the engine room to cool same. Therefore, the radiator can be cooled to an insufficient degree, causing an excessive rise in the engine temperature, and hence leading to the above-mentioned disadvantages.

SUMMARY OF THE INVENTION

It is therefore an object of the invention to provide an engine room cooling control system, which is not only capable of properly controlling the temperature of the engine room so as to prevent thermal damage to the engine, but also capable of effecting the cooling control in an efficient manner so as to prevent wasteful consumption of the battery.

A further object of the invention is to reduce the manufacturing cost and size of the cooling control system.

Another object of the invention is to prevent an excessive rise in the temperature of the engine as well as that of the turbocharger in the event of failure of sensors or the control system, to thereby secure proper operation of the engine and avoid shortening of the life thereof.

According to a first aspect of the invention, there is provided a cooling control system for controlling cooling of an engine room of an engine, comprising:

cooling means arranged within the engine room for cooling the engine room;

driving means for electrically driving the cooling means;

temperature detecting means for detecting a temperature of the engine; and control means for comparing a value of the temperature of the engine detected by said temperature detecting means with a plurality of different predetermined values, and based upon results of the comparison, controlling the driving means for driving said cooling means in a manner such that as the detected temperature is higher, a flow rate of cooling air created by the cooling means and flowing in the engine room is larger.

Preferably, the temperature detecting means detects the temperature of coolant in the engine.

Also preferably, the cooling means comprises a first cooling fan arranged at a first location within the engine room for cooling the engine, and a second cooling fan arranged at a second location within the engine room.

Further preferably, the first cooling fan is capable of being selectively driven for rotation at a predetermined higher speed and at a predetermined lower speed. The driving means comprises first driving means for driving the first cooling fan, and second driving means for driving the second cooling fan. The control means controls the first and second driving means in such a manner that the first cooling fan alone is driven for rotation at the predetermined lower speed when the value of the temperature of the engine detected by the temperature detecting means is above a first predetermined value and below a second predetermined value higher than the first predetermined value, the first cooling fan alone is driven for rotation at the predetermined higher value when the detected value of the temperature of the engine is above the second predetermined value and below a third predetermined value higher than the second predetermined value, and the first cooling fan is driven for rotation at the predetermined higher speed and at the same time the second cooling fan is driven when the detected value of the temperature of said engine is above the third predetermined value.

The first cooling fan may be a radiator fan.

Preferably, the second cooling fan comprises a fan arranged at a rear upper portion of the engine room for introducing fresh air into the engine room from outside.

Further preferably, the control means is operable when the engine is in operation, for comparing the detected value of the temperature of the engine with the plurality of different predetermined values, and during the operation of the engine, based upon results of the comparison, controlling the driving means for driving the cooling means in such a manner that as the detected temperature is higher, the flow rate of cooling air in the engine room is larger.

According to a second aspect of the invention, there is provided a cooling control system for controlling cooling of an internal combustion engine having a turbocharger, an intercooler, and sensor means for detecting operating conditions of the engine, comprising:

cooling means for cooling at least one of the turbocharger and the intercooler;

driving means for driving the cooling means; and control means operable when abnormality occurs in the sensor means, for operating the driving means to drive the cooling means.

Preferably, the control means compares a temperature of the engine with at least one predetermined value, and controls the driving means based upon a result of the comparison, and the control means changes the at least one predetermined value such that the cooling means can operate within an expanded range of the temperature of the engine when abnormality occurs in the sensor means.

The cooling means may comprise a pump for supplying coolant to the at least one of the turbocharger and the intercooler, and a radiator fan for cooling said engine. The pump and the radiator fan are both operated by the driving means when abnormality occurs in the sensor means.

Preferably, the sensor means includes at least one sensor for sensing at least one temperature of the engine. and the control means decides that the at least one sensor is abnormal when a value of the at least one temperature of the engine detected by the at least one sensor falls out of a predetermined range within which outputs from the at least one sensor can fall when it is normally functioning, and then sets the detected value of the at least one temperature to a predetermined fixed value.

The predetermined fixed value should be higher than a normal value so that the cooling means can be positively operated.

According to a third aspect of the invention, there is provided a cooling control system for controlling cooling of an internal combustion engine having a turbocharger, and an intercooler, comprising:

cooling means for cooling at least one of the turbocharger and the intercooler;

driving means for driving the cooling means;

control means for controlling the driving means to drive the cooling means; and fail-safe means operable when abnormality occurs in the control means, for operating the driving means to drive the cooling means.

Preferably, the fail-safe means includes an analog circuit connected to both the control means and the driving means. The cooling means comprises a pump for supplying coolant to the at least one of the turbocharger and the intercooler, and a radiator fan for cooling the engine. The analog circuit causes said driving means to operate both the pump and the radiator fan when abnormality occurs in the control means.

Further preferably, the fail-safe means includes timer means for counting a predetermined period of time which is longer than a period of time within which the control means is to complete a predetermined processing, and generating a signal and supplying same to the analog circuit when counting up the predetermined period of time counted from the time the control means started the predetermined processing, before the control means completes same. The analog circuit is responsive to the signal for causing the driving means to operate both the pump and the radiator fan.

The above and other objects, features, and advantages of the invention will be more apparent from the ensuing detailed description taken in conjuncton with the accompanying drawings.

BRIEF DESCRIPTION OF THE DRAWINGS

FIG. 7 is a diagram showing a map applied in execution of the subroutine of FIG. 6.

DETAILED DESCRIPTION

The invention will now be described in detail with reference to the drawings showing embodiments thereof.

Figure 1:
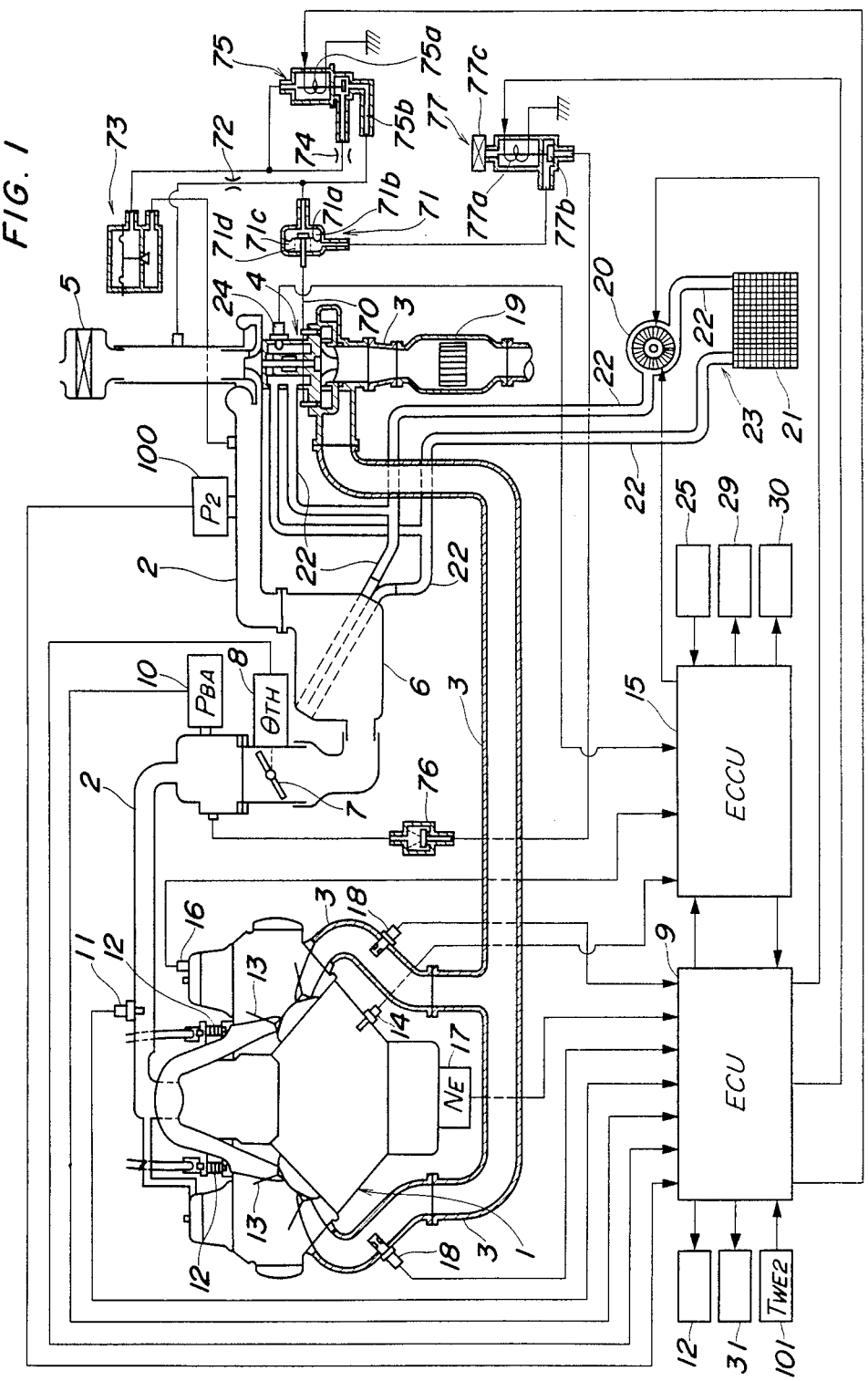
FIG. 1 is a schematic diagram illustrating the whole arrangement of a fuel injection control system for an internal combustion engine, to which is applied the cooling control system according to the invention.

Referring first to FIG. 1, there is illustrated the whole arrangement of a fuel supply control system for an internal combustion engine, to which the engine room-cooling control system according to the invention is applied. In the figure, the engine is equipped with a supercharger, more specifically, a water-cooled turbocharger. Reference numeral I designates an internal combustion engine which may be a six-cylinder type, for instance. The engine has an intake pipe 2 connected to an upstream side thereof, and an exhaust pipe 3 connected to a downstream side thereof. The turbocharger 4 is arranged intermediately between the intake pipe 2 and the exhaust pipe 3.

In the intake pipe 2, there are provided an air-cleaner 5, an intercooler 6, and a throttle valve 7 in the order mentioned as viewed from the upstream side.

A supercharging pressure ($P_2$) sensor 100 is arranged between the turbocharger 4 and the intercooler 6, and supplies a signal indicative of the detected supercharging pressure to an electronic control unit (hereinafter referred to as "the ECU") 9.

Connected to the throttle valve 7 is a throttle valve opening ($\theta$th) sensor 8, which detects the throttle valve opening ($\theta$th), converts the detected throttle valve opening ($\theta$th) into an electrical signal, and supplies the signal to the ECU 9.

Arranged at a location downstream of the throttle valve 7 is an intake pipe absolute pressure ($P_{BA}$) sensor 10, which detects absolute pressure in the intake pipe, converts the detected intake pipe absolute pressure ($P_{BA}$) into an electrical signal, and supplies the signal to the ECU 9. An intake air temperature ($T_A$) sensor 11 is provided at a location downstream of the intake pipe absloute pressure ($P_{BA}$) sesnor 10, which detects intake air temperarue ($T_A$), and supplies a signal indicative of the detected temperature ($T_A$) to the ECU 9.

Fuel injection valves 12, two of which are shown, are arranged in the intake pipe 2 intermediately between the engine 1 and the throttle valve 7, each at a location slightly upstream of a corresponding intake valve 13, for each cylinder. Each fuel injection valve is connected to a fuel tank, not shown, and also electrically connected to the ECU 9 so that its opening valve period, i.e. the amount of fuel to be supplied to the engine 1, is controlled by a driving signal from the ECU 9.

First and second engine coolant temperature ($T_W$) sensors (hereinafter respectively referred to as "the $T_{WE1}$ sensor" and "the $T_{WE2}$ sensor") 14, 101, which may be formed of a thermistor or the like, are mounted in the cylider block of the engine in a manner embedded in the peripheral wall of an engine cylinder having its interior filled with coolant, to detect engine coolant temperature ($T_W$), and supply electrical signals indicative of the detected engine coolant temperature ($T_W$) to an electronic cooling control unit for controlling the cooling of the engine room (hereinafter referred to as "the ECCU") described below and the ECU 9, respectively.

An lubricating oil temperature sensor (hereinafter referred to as "the $T_{OIL}$ sensor") for detecting lubricating oil temperature is mounted in the cylinder block of the engine 1, and supplies a signal indicative of the detected lubricating oil temperature to the ECCU 15.

An engine rotational speed speed sensor (hereinafter referred to as "the Ne sensor") 17 is arranged in facing relation to a camshaft, not shown, of the engine 1 or a crankshaft, not shown, of same. The Ne sensor is adapted to generate a pulse of a top-dead-center (TDC) position signal (hereinafter referred to as "the TDC signal") at a predetermined crank angle postion of each cylinder of the engine which comes a predetermined crank angle earlier relative to the top-dead-center (TDC) position at which the suction stroke thereof starts, whenever the engine crankshaft rotates through 120 degrees. The TDC signal pulses generated by the Ne sensor are supplied to the ECU 9.

$O_2$ sensors 18, 18 are inserted in the exhaust pipe 3 at locations immediately downstream of the engine 1 for detecting the concentration of oxygen ($O_2$) in the exhaust gases and supplying an electrical signal indicative of the detected oxygen concentration to the ECU 9. At a location downstream of the turbocharge 4 in the exhaust pipe 3, there is arranged a three-way catalyst 19 for purifying ingredients HC, CO, and NOx contained in the exhaust gases.

The turbocharger 4 is, as described in detail hereinbelow, is a variable capacity type, to which is connected a conduit line 22 across which are provided a water pump 20 and a subradiator 21. More specifically, the water pump 20, the subradiator 21 and the conduit line 22 copperate to form a cooling system 23 for cooling the water-cooled turbocharger which is provided independently of a cooling system, not shown, for cooling the engine 1. Cooling water or coolant supplied by the cooling system 23 circulates in a water jacket 57 (shown in FIG. 3) formed within a lubricating part casing 43, referred to hereinafter, of the turbocharger 4 to thereby cool the turbocharger 4. Further, the conduit line 22 is bifurcated into two branches, one of which extends through the intercooler 6 for cooling the intake air taken in through the intercooler 6. In the cooling system 23, at a location immediately downstream of the turbocharger 4, there is arranged a turbocharger-coolant temperature sensor (hereinafter referred to as "the $T_{WT}$ sensor") 24 for detecting the temperature of coolant for the turbocharger and supplying an electrical signal indicative of the detected turbocharger-coolant temperature to the ECCU 15. An ignition switch 25 is also electrically connected to the ECCU 15 to supply same with an electrical signal indicative of the ON or OFF state of the ignition switch 25.

Figure 2:
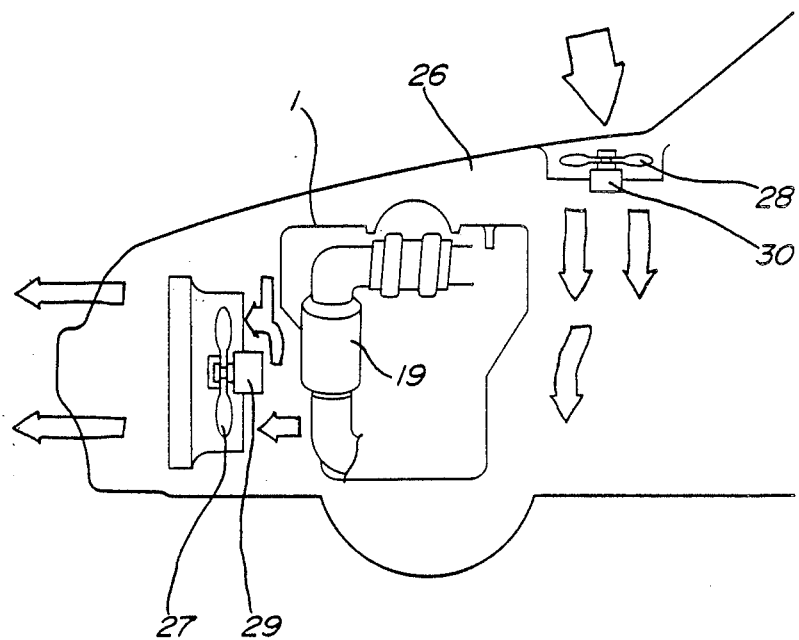
FIG. 2 is a schematic view showing the interior of an engine room of an automotive vehicle in which the engine in FIG. 1 is installed.

Further, as shown in FIG. 2, Within an engine room 26, a radiator fan 27 is arranged at a front portion thereof for blowing air in the forward or backward direction, and a bonnet fan 28 is arranged at a rear upper portion thereof for blowing air in the downward direction. The radiator fan 27 is driven by a first motor 29, and can be adjusted with respect to the direction and speed of rotation of the fan. The bonnet fan 28 is driven by a second motor 30.

Figure 3:
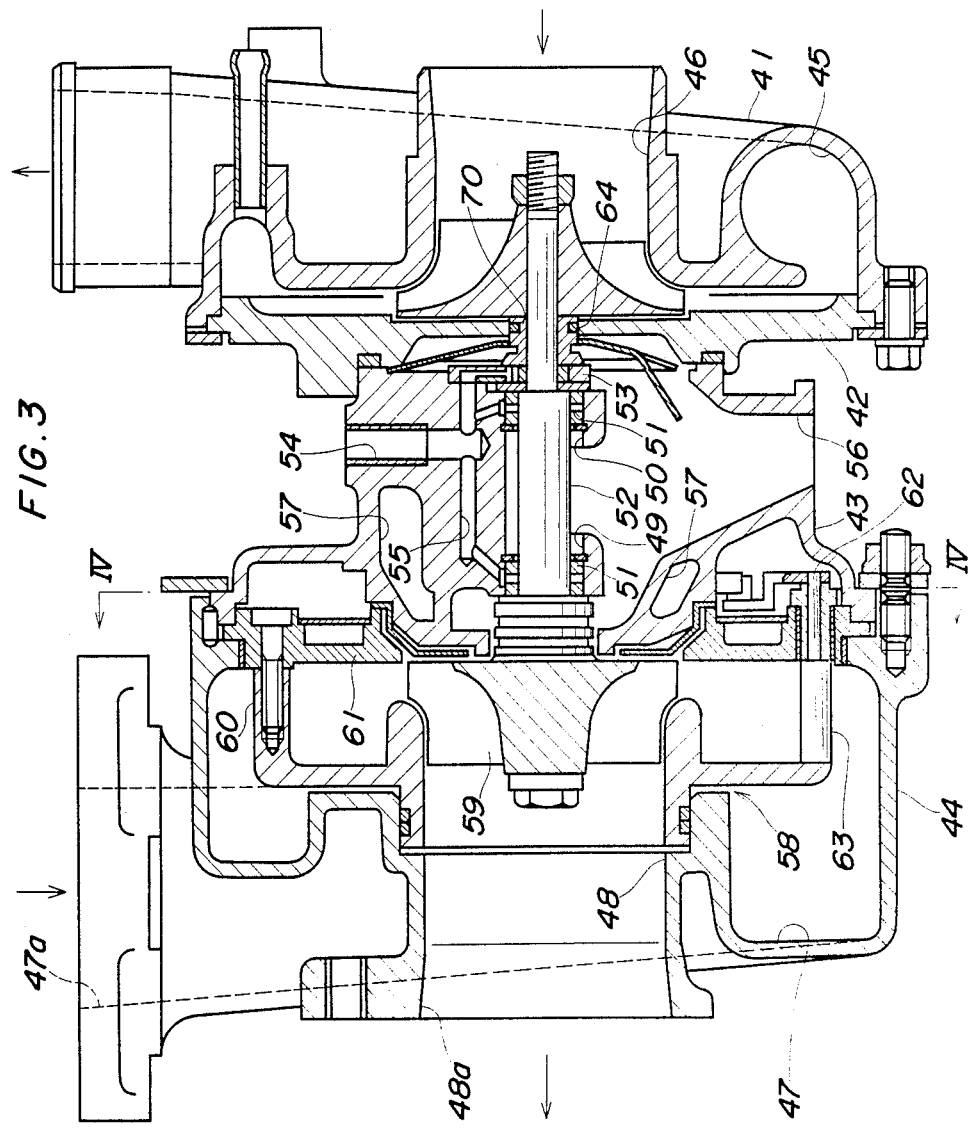
FIG. 3 is a longitudinal cross-sectional view of a turbocharger in FIG. 1.

FIG. 3 shows the whole construction of the turbocharger 4, which comprises a housing formed of a compressor casing 41 constituting a scroll of a compressor part, and a back plate 42 closing the back side of the compressor casing 41, the aforementioned lubricating part casing 43 supporting therein a main shaft 52 of the turbocharger 4, and a turbine casing 44 constituting a scroll of a turbine part.

The compressor casing 41 is formed therein with a scroll passage 45 connected to the intake pipe 2, and an axial passage 46, the former serving as an intake air outlet and the latter as an intake air inlet.

The turbine casing 44 is formed therein with a scroll passage 47 having an inlet opening 47a tangetially extending thereto, an outlet passage 48 which extends in an axial direction and has an outlet opening 48a, with the inlet opening 47a and the outlet opening 48a being connected to the exhaust pipe 3.

Bearing holes 49, 50 are formed in the lubricating part casing 43, in which the main shaft 52 is received and supported, by radial bearings 51, 51. A thrust bearing 53 is interposed between the back plate 42 and an opposed end face of the lubricating casing 43.

A lubricating oil inlet port 54 is formed in an upper side portion, as viewed in FIG. 3, of the lubricating part casing 43 for delivering lubricating oil which is supplied from a lubricating oil pump, not shown, so as to be commonly used for the turbocharger 4 and the engine 1, to the radial bearings 51, 51 and the thrust bearing 53 by way of a lubricating oil passage 55 formed in the lubricating part casing 43. Lubricating oil from lubricated parts is drained through a lubricating oil outlet port 56 formed in the lubricating part casing 43, and collected into an oil sump, not shown.

In order to prevent the lubricating oil supplied to the thrust bearing 53 from flowing into the compressor side, a seal ring 64 is provided in a through hole formed in a central portion of the back plate 42 through which a bushing 70 fitted on the main shaft 52 extends.

The water jacket 57 is formed within the lubricating part casing 43. The water jacket 57 has an annular cross-section at a portion closer to the turbine casing 44, and a U-shaped cross-section at a portion corresponding to an upper side portion of the lubricating part casing 43 as viewed from FIG. 3, and is connected, to the conduit line 22 extending from the cooling system 23 for the turbocharger 4 so that cooling water circulates therein to thereby cool the turbocharger 4.

Figure 4:
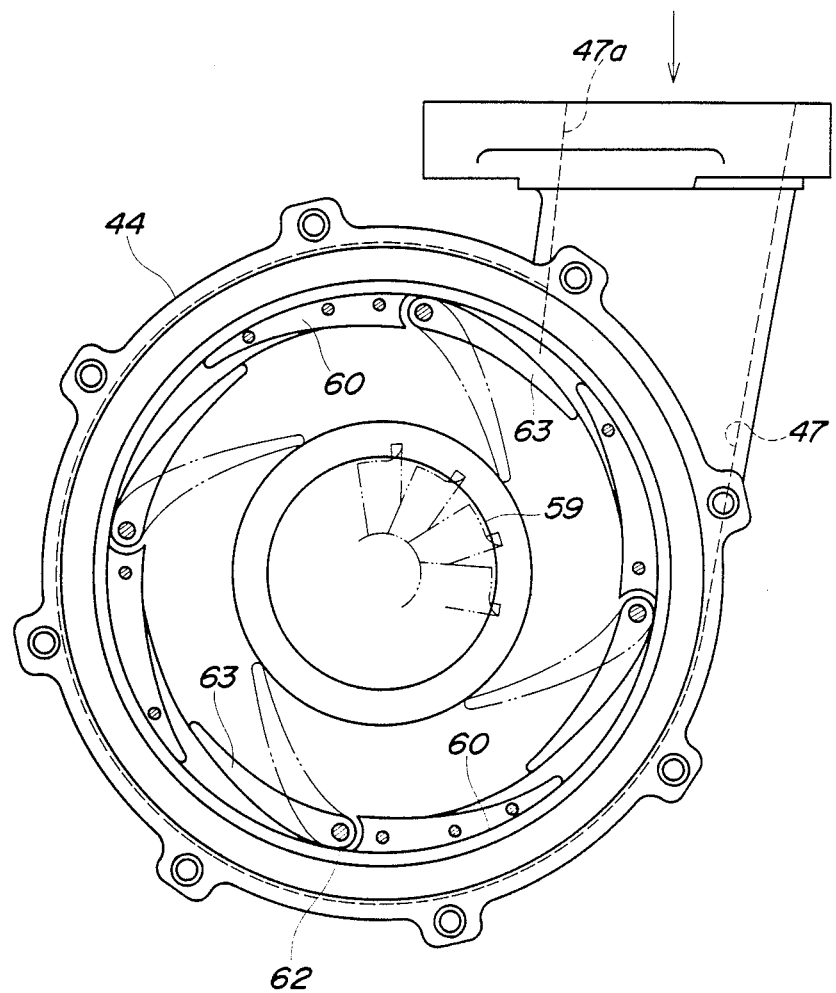
FIG. 4 is an end view showing a turbine casing in FIG. 3 taken along line IV—IV in the figure.

As shown in FIG. 4, a stationary vane member 58 is arranged in a central portion of the scroll passage 47, which has a peripheral portion thereof formed with four stationary vanes 60 concentrically surrounding a turbine wheel 59. These stationary vanes are arcuate in shape and are circumferentially arranged at equal intervals with each other.

Disposed between adjacent stationary vanes 60 are movable vanes 63 with one ends thereof secured to respective rotary pins 62 rotatably supported by the back plate 61. All the movable vanes 54 are pivotable simultaneously with each other to adjust the area of space (hereinafter called "space area") between adjacent stationary vanes 60.

Each movable vane 63 is also arcuate in shape, with almost the same curvature as the stationary vanes 60, and pivotable between a fully closed position shown by the solid line in FIG. 4 and a fully open position shown by the chain line in the figure.

THe rotary pins 62 are operatively connected to an actuator 71 in FIG. 1 by means of a driving rod 70 appearing in FIG. 1 so that the movable vanes 63 are simultaneously controlled to open and close by the actuator 60.

When the driving rod 70 is shifted in its extending direction (leftward as viewed in FIG. 1), the opening degree of the movable vanes 63 is decreased to thereby increase the space area between adjacent movable and stationary vanes, whereas when the rod 70 is shifted in its receding direction (rightward as viewed in FIG. 1), the opening degree of the movable vanes 63 is increased to thereby decrease the space area between adjacent movable and stationary vanes. Thus, the opening degree of the movable vanes 63 is controlled to adjust the capacity of the turbocharger.

The actuator 71 has, as shown in FIG. 1, a first pressure chamber 71b and a second pressure chamber 71c separated from each other by a diaphragm 71a. The driving rod 70 penetrates a housing wall of the actuator 71 and is connected to the diaphragm 71a on the second pressure chamber 71c side. A spring 71d is mounted in the second pressure chamber 71c for biasing the diaphragm in a direction such that the driving rod 70 is receded, i.e. in a direction such that the opening degree of the movable vanes 63 is increased.

Connected to the first pressure chamber 71 are a portion of the intake passage between the air cleaner 5 and the turbocharger 4 by way of a restriction 22, and a portion of the intake passage between the intercooler 6 and the turbocharger 4 by way of a regulator 73, a restriction 74, and a control valve 75 for introducing supercharging pressure into the chamber 71.

The control valve 75 for introducing supercharging pressure is a normally-closed ON-OFF two position type electromagnetic valve which comprises a solenoid 75a, and a valve body 75b which is opened upon energization of the solenoid 75a. When the solenoid 75a is energized to open the valve body 75b, supercharging pressure $P_2$ within the intake passage between the intercooler 6 and the turbocharger 4 is introduced into the first pressure chamber 71b of the actuator 71.

Accordingly, the magnitude of supercharging pressure is controlled by controlling the ON-OFF duty ratio $D_1$ of the solenoid 75a of the control valve 75, in such a manner that as the duty ratio $D_1$ is larger, higher pressure is introduced into the first pressure chamber 71b to thereby reduce the supercharging pressure $P_2$.

In the meanwhile, connected to the second pressure chamber 71c of the actuator 71 is a portion of the intake passage downstream of the throttle valve 7 by way of a constant pressure valve 76 and a control valve 77 for introducing negative pressure into the chamber 71c. The control valve 77 for introducing negative pressure is, similarly to the control valve 75 for introducing supercharging pressure, a normally-closed ON-OFF two position type electromagnetic valve which comprises a solenoid 77a, and a valve body 77b. When the solenoid 77a is energized to open the valve body 77b, negative pressure regulated to a constant value by the constant pressure valve 76 is introduced into the second pressure chamber 71c, whereas when the solenoid 77a is deenergized to close the valve body 77b, the atmosphere is introduced into the second pressure chamber 71c by way of the air cleaner 77c.

Accordingly, supercharging pressure $P_2$ is also controlled by controlling the ON-OFF duty ratio $D_2$ of the solenoid 77a of the control valve 77, in such a manner that as the ON-OFF duty ratio $D_2$ is larger, lower pressure is introduced into the second pressure chamber 71c to thereby reduce the supercharging pressure $P_2$.

The solenoids 75a, 77a of the control valves 75, 77 are connected to the ECU 9, and the duty ratios $D_1$, $D_2$ are controlled by signals therefrom.

The ECU 9, which operates when the engine 1 is in operation, determines operating conditions of the engine 1 based on input signals from various parameter sensors, calculates a fuel injection period $T_{OUT}$ for fuel injection valves 12, timing of ignition of an ignition device 31, etc. so as to optimize operating characteristics of the engine, such as fuel consumption and accelerabirity, based on the determined operating conditions, and supplies driving signals based on the results of calculation to the fuel injection valves 12 and the ignition device 31.

The ECU 9 also calculates the duty ratios $D_1$, $D_2$ for the control valves 75, 77 in response to input signals from parameter sensors, and supplies driving signals to the control valves 75, 77 based on the calculated duty ratios $D_1$, $D_2$ to drive the control valves 75, 77 and hence also the actuator 71 linked to the turbocharger 71, Whereby the capacity of the turbocharger 4 is controlled to an optimum value.

Further, the ECU9, when the engine 1 is in operation, executes a control program, hereinafter described, to decide whether to effect operation or stoppage of the water pump 20 in response to input signals from parameter sensors and supplies a corresponding driving signal to the water pump 20.

The ECCU 15, which operates when the engine 1 is in operation or over a predetermined period of time after the engine 1 has ceased to operate, decides as to the operation or stoppage, direction of rotation, and speed of the radiator fan 27, and the operation or stoppage of the bonnet fan 28, as well as the operation or stoppage of the water pump 20 after stoppage of the engine 1, based on input signals from the $T_{WE1}$ sensor 14, the $T_{OIL}$ sensor 16, and the $T_{WT}$ sensor 24, and supplies driving signals resulting from the above decisions to the water pump 20, and the first and second motors 29, 30.

The ECCU 15 is electrically connected to the ECU 9. When the engine 1 is in operation, the ECU 9 executes control of the operation and stoppage of the bonnet fan 28 by way of the ECCU 15, and carries out a fail-safe operation for the bonnet fan 28 when the ECCU 5 detects abnormality thereof. Further, when the engine 1 is in operation, the ECU 9 also carries out a fail-safe operation, hereinafter described, when the ECCU 15 detects abnormality of any of the sensors.

Figure 5A:
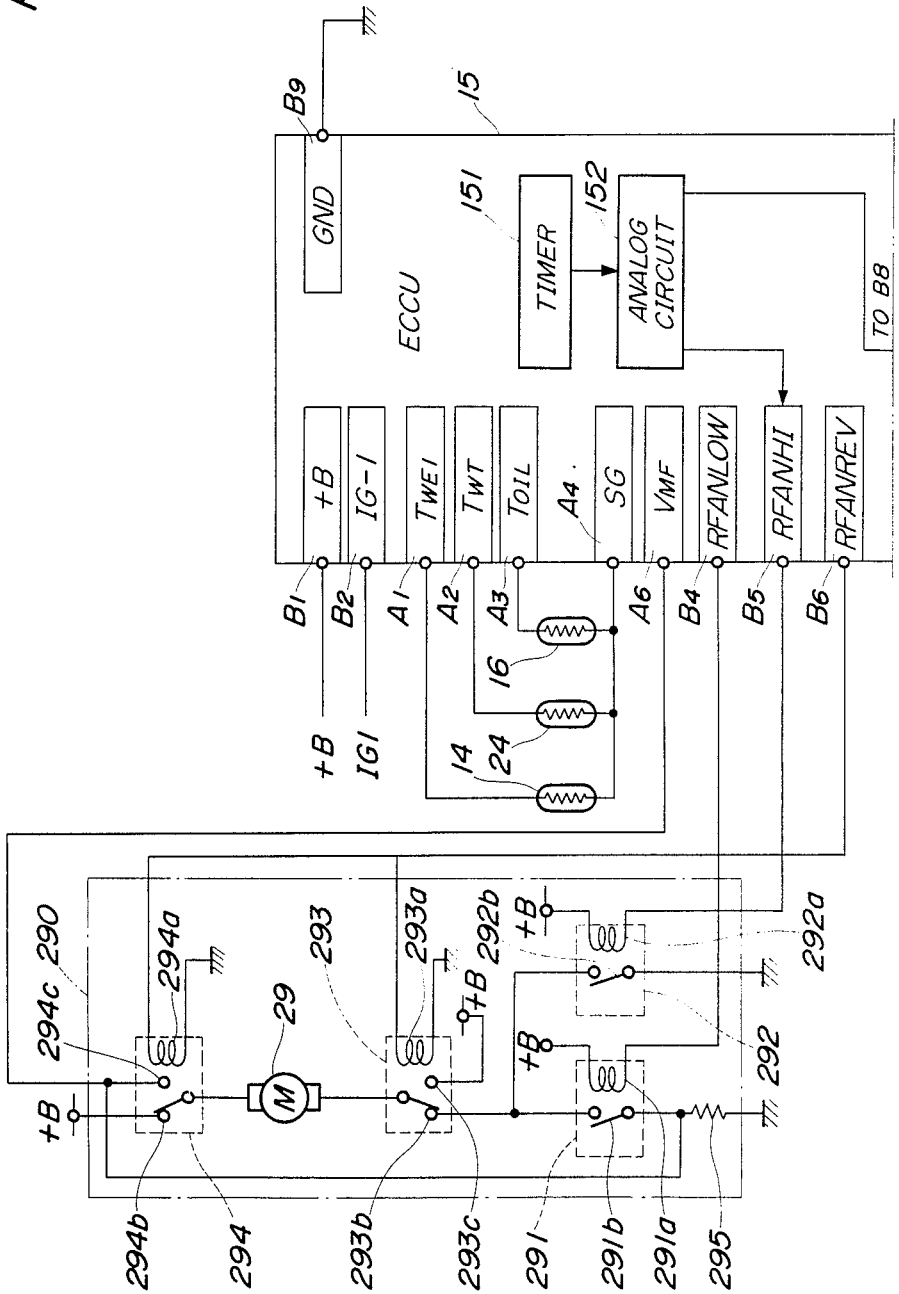
FIG. 5 is a wiring diagram showing electrical connections of an electronic control unit for cooling control in FIG. 1, with external elements.

FIG. 5 is a wiring diagram showing the external connections of the ECCU 15 in detail. The ECCU 15 has terminals $B_1$ to $B_9$, and $A_1$ to $A_{12}$. The terminal $B_1$ is connected to a battery, to be supplied with an operating voltage therefrom. The terminal $B_9$ is grounded to the body of the vehicle.

The terminal $B_2$ is connected to an ordinary ON-OFF terminal of the ignition switch 25, whereas the terminal $B_3$ is connected to the battery even when the ignition switch is OFF. If the ignition switch 25 is turned off or opened when the engine is in operation, the engine 1 ceases to operate, and the ECU 5 also becomes inoperative (except for the function of its memory preserving its stored data) by the turning-off of the ignition switch 25. In contrast, the ECCU 15 can operate, if desired, over a predetermined period of time even after the engine 1 has ceased to operate, since it is provided with the terminal $B_2$ which is connected to the battery even after the ignition switch 25 is turned off. The predetermined period of time after stoppage of operation of the engine 1 is set by a timer which is started when the ignition switch 25 is turned off.

During the predetermined period of time set by the timer over which the ECCU 15 is operated after stoppage of the engine 1, at least one of the radiator fan 27, the bonnet fan 28, and the water pump 20 is electrically driven in the state where the engine is not in operation, hence in the state where charging of the battery is not carried out by a generator installed on the vehicle. Therefore, the predetermined period of time is set to such a value as to minimize the consumption of electricity charged in the battery and at the same time enhance the cooling performance while taking into consideration the size of the engine room and the layout of engine parts accommodated therein. For example, the predetermined period of time over which the ECCU is allowed to operate is set to 15 minutes.

During the predetermined period of time set by the time over which the ECCU 15 is operated, the ECCU 15 as the cooling control unit is constantly supplied with electric power from the battery to effect predetermined cooling control, and upon lapse of the predetermined period of time, the ECCU 15 ceases to effect the control.

The terminals $A_1$ to $A_3$ are for inputting into the ECCU 15 signals from the $T_{WE1}$ sensor 14, the $T_{WT}$ sensor 24, and the $T_{OIL}$ sensor 16, respectively. The terminal $A_4$ is for grounding the signal system of the internal circuit of the ECCU 15. The terminal $A_5$ is connected to an air conditioning (A/C) unit 80, and an ON-OFF signal from the switch of the air conditioning unit 80 is inputted to the ECCU 15 therethrough.

The terminals $B_4$ to $B_6$ are for controlling the radiator fan 27 and are connected to a driving circuit 290. The driving circuit 290 has first and second relay circuits 291, 292 for selecting low-speed forward rotation and high-speed forward rotation of the radiator fan 27, which respectively comprise coils 291a, 292a and normally-open contacts 291b, 292b, third and fourth relay circuits 293, 294 for selecting forward rotation and reverse rotation of the radiator fan 27, which respectively comprise coils 293a, 294a, normally-closed terminals 293b, 294b, and normally open terminals 293c, 294c, and a resistance 295. The terminal $B_4$ for passing instructions for low speed rotation of the radiator fan 27 is connected to the first relay circuit 291, the terminal $B_5$ for passing instructions for high speed rotation of the radiator fan 27 is connected to the second relay circuit 292, the terminal $B_6$ for passing instructions for reverse rotation is connected to the third and fourth relay circuits 293, 294.

High speed, low speed, forward, and reverse rotations of the radiator fan 27 are carried out in the following manner.

To select low-speed forward rotation of the radiator fan 27, a low-level signal is supplied through the terminal $B_4$ to the first relay circuit 291 to cause same to operate, whereby driving current which is decreased by the resistance 295 flows to the first motor 29 to thereby cause low-speed rotation of the radiator fan 27. To select high-speed forward rotation of the radiator fan 27, a low-level signal is supplied through the termnial $B_5$ to the second relay circuit 292, whereby large driving current flows to the motor 29 to thereby cause high speed rotation of the radiator fan 27.

To select reverse rotation of the radiator fan 27, a high-lever signal is supplied through the terminal $B_6$ to the third and fourth relay circuits 293, 294 to cause the respective relay contacts to be connected to the normally open terminals 293c, 294c, whereby the polarity of voltage applied to the motor 29 is inverted and at the same time driving current is decreased by the resistance 295 to thereby cause low-speed reverse rotation of the radiator fan 27.

The reverse rotation of the radiator fan 27 is carried out continuously or intermittently over the predetermined period of time after stoppage of the engine 1. In this state, as shown by the arrows in FIG. 2, air in the engine room 26 is discharged therefrom to the outside in front of the vehicle.

The terminal $B_7$ is for controlling the bonnet fan 28, and is connected to a relay circuit 301 which is part of a driving circuit 300 and comprises a coil 301a, and normally-open contacts 301b. A fuse 310 for exclusive use is also provided in the driving circuit 300. The operation of the bonnet fan 28 is different from that of the radiator fan 27 in that it is merely driven or stopped by the second motor 30. The bonnet fan 28 is operated when a high-level signal is supplied to the terminal $B_7$, and stopped when a low-level signal is supplied thereto.

The operation of the bonnet fan 28 is continuously or intermittently carried out over the predetermined period of time after the stoppage of the engine 1.

The terminal $B_8$ is for controlling the water pump 20, and is connected to a driving circuit 200 having a third motor 201 for driving the water pump 20, and a relay circuit 202 comprising a coil 202a and normally-open contacts 202b. The driving circuit 200 also has a fuse 210 for exclusive use. Similarly to the operation of the bonnet fan 28, the water pump 20 is also merely driven or stopped by the third motor 201. The water pump is operated when a high-level signal is supplied to the terminal B$_8$ and stopped when a low-level signal is supplied thereto.

The operation of the water pump 20 is carried out continuously, or intermittently in place of the bonnet fan 28, during operation of the engine 1 or over the predetermined period of time after stoppage of the engine 1.

The terminals A$_6$ to A$_8$ serve as input ports for terminal voltages V$_{MF}$, V$_{BF}$, and V$_{WP}$ of the respective first to third motors 29, 30, 201 for the radiator fan 27, the bonnet fan 28, and the water pump 20.

The terminals A$_9$ to A$_{12}$ are connected to the ECU 9. The terminal A$_9$ is for inputting a signal supplied from the ECU 9 for controlling the water pump 20. The control signal is obtained based on operating conditions of the engine 1 determined by the engine rotational speed, the engine coolant temperature, the intake air temperature, etc. The terminal A$_{10}$ serves as a fail-safe output terminal, through which a control signal is supplied to the ECU 9, for giving instructions for fail-safe operation when abnormality is detected. The ECU 9 carries out fail-safe operation in response to the control signal.

The terminal A$_{11}$ is connected to an air-conditioning refrigerant pressure switch 81 and supplied with a signal indicative of ON- or OFF-state of the switch 81. The switch 81 is turned on when the refrigerant pressure of a compressor, not shown, of the air-conditioning unit is equal to or higher than a predetermined value. The ON-OFF signal is also supplied to the ECU 9. The terminal A$_{12}$ outputs to the ECU 9 a signal indicating that the air-conditioning unit is in operation.

The aforesaid switch 81 and terminal A$_{11}$ are used for controlling the operation of the radiator fan in the following manner.

If the engine coolant temperature T$_{WE1}$ exceeds a predetermined high temperature value (e.g. 90° C.), it is necessary to supply a low-level voltage signal to the terminal B$_5$ so as to cause high-speed forward rotation of the radiator fan to thereby air-cool the engine 1. However, even if the engine coolant temperature T$_{WE1}$ is slightly lower than the predetermined high temperature (e.g. higher than 84° C.), depending on the operation of the air conditioning unit and the pressure of the refrigerant, it may be sometimes desirable to cause rotation of the radiator fan 27, and to switch between high speed rotation and low speed rotation thereof. Particularly, if the radiator fan 27 and the condenser fan of the air conditioning unit are interconnected to operate together, degradation of the performance of the air conditioning unit can be prevented by cooling the refrigerant through rotating the radiator fan 27 even before the engine coolant temperature T$_{WE1}$ exceeds the predetermined high temperature. Further, in this case, if the intensity of blowing, i.e. the speed of rotation of the radiator fan 27, is increased or decreased depending on whether or not the pressure of the refrigerant is higher than a predetermined value (e.g. 10 kg/cm$^2$), it is possible to control air conditioning more properly.

Therefore, when the engine coolant temperature T$_{WE1}$ does not exceed the predetermined high temperature value, the radiator fan 27 is controlled in the following manner. If the pressure of refrigerant of the air conditioning unit is high, i.e. if the aforesaid switch 81 is ON, the radiator fan 27 is controlled in advance to high speed rotation, whereas if not, i.e. if the switch 81 is OFF, the radiator fan 27 is controlled to low speed rotation.

The air-conditioning refrigerant pressure switch 81 and the terminal A$_{11}$ are provided for collecting information necessary for the above-described control of the radiator fan 27. The program for this control may be stored in advance in the memory means of the ECCU 15.

The ECCU 15 comprises an input circuit which is supplied with various input signals, carries out waveform-shaping of some of the input signals, shifts the voltage level of input signals to a predetermined level, converts analog signals of the input signals to digital signals, etc., a central processing unit (CPU), memory means storing programs to be executed in the CPU and for storing the calculation results outputted from the CPU, and an output circuit for outputting signals to the terminals B$_4$ to B$_8$, A$_{10}$, and A$_{12}$. Further, if the water pump 20 is intermittently operated as described hereinbefore, the ECCU 15 may also include a timer for controlling the operation of the water pump 20.

Further, the ECCU 15 includes a timer 151 for counting a processing time period of the CPU, hereinafter referred to, to determine whether or not the CPU is normally functioning, and an analog circuit 152 is responsive to a predetermined signal generated when the timer has counted up the processing time period for applying predetermined voltages to the terminals B$_5$ and B$_8$.

The cooling control system constructed as above operates as follows.

Figure 6A:
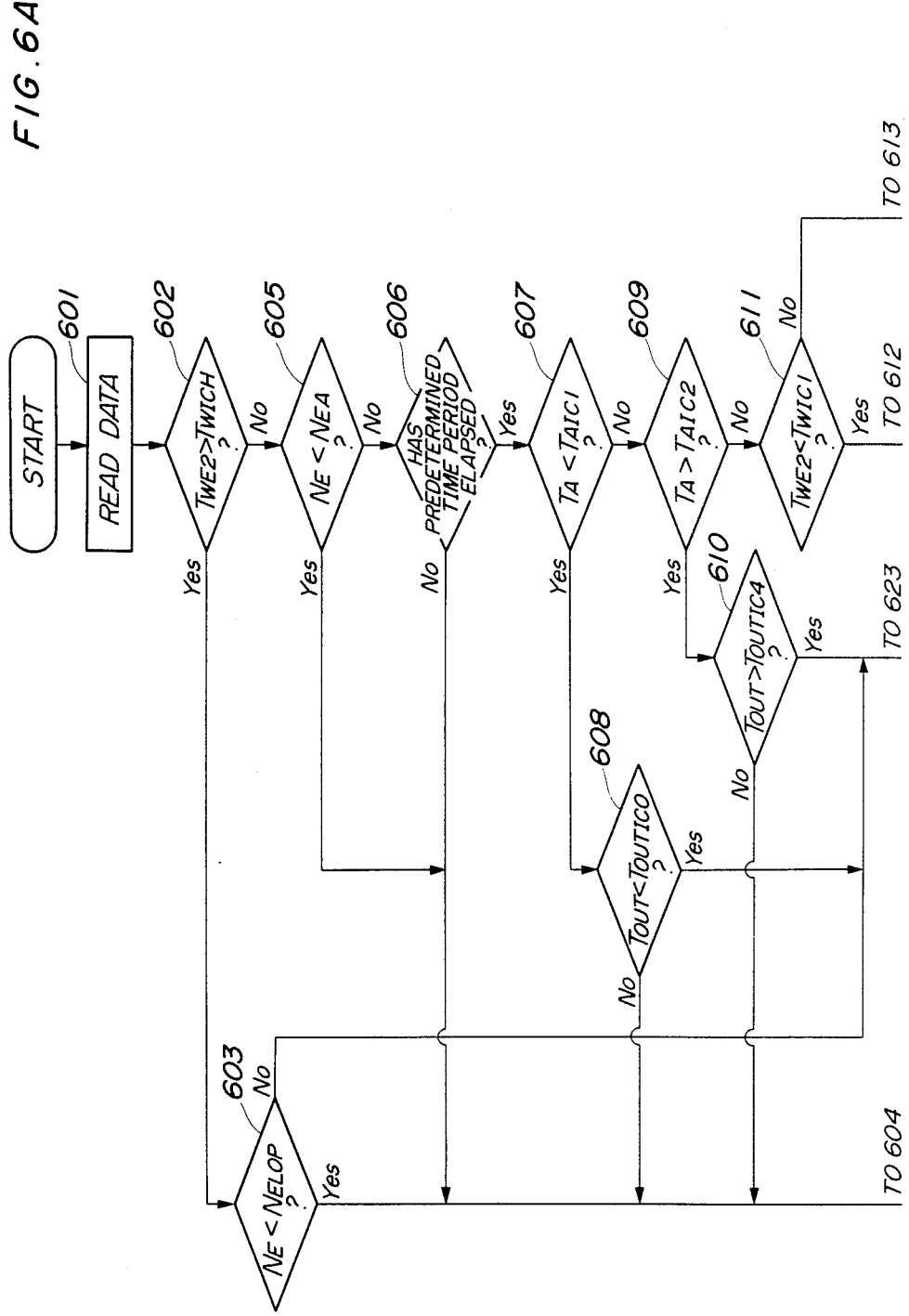
FIG. 6 is a flowchart showing a subroutine for controlling operation and stoppage of a water pump in FIG. 1.

FIG. 6 shows a subroutine for controlling the operation and stoppage of the water pump 20. This program is executed by the ECU 9 when the ignition switch 25 is ON, that is, when the engine 1 is in operation, either in synchronism with generation of the TDC signal pulses or in asynchronism therewith, i.e. at predetermined constant intervals of time.

First, at a step 601, reading is effected of respective output values of engine coolant temperature T$_{WE2}$, intake air temperature T$_A$, and engine rotational speed N$_E$ from the engine coolant temperature sensor, intake air temperature sensor, and engine rotational speed sensor, as well as data on the fuel injection period T$_{OUT}$ calculated as above for the fuel injection valves 12. Then, it is determined at a step 602 whether or not the engine coolant temperature T$_{WE2}$ is higher than a predetermined value T$_{WICH}$ (e.g 100° C.) above which the engine 1 should be deemed to be in a very high temprearture condition. If the answer is yes, it is determined at a step 603 whether or not the engine rotational speed N$_E$ is lower than a predetermined value N$_{ELOP}$ which corresponds to the idling speed of the engine. If the answer is yes, the water pump 20 is stopped at a step 604, followed by terminating the program, whereas if the answer is no, the program proceeds to a step 623, hereinafter referred to.

If the answer to the question of the step 602 is no, i.e. if T$_{WE2}$ ≦ T$_{WICH}$, it is determined at a step 605 whether or not the engine rotational speed N$_E$ is lower than a predetermined value N$_{EA}$ (e.g. 400 rpm) which corresponds to a value assumed at the completion of cranking of the engine. If the answer is yes, it is decided that the engine is still being cranked, and then the above step 604 is executed, and then the program is ended.

If the answer at the step 605 is no, i.e. if $N_E \geq N_{EA}$, it is determined whether or not a predetermined period of time has elapsed after the condition of $N_E \geq N_{EA}$ has been satisfied, at a step 606. If the predetermined time period has not elapsed, the above step 604 is executed, while if it has elapsed, the program proceeds to a step 607.

At the step 607, it is determined whether or not the intake air temperature $T_A$ is lower than a first predetermined value $T_{AIC1}$ (e.g. 15° C.). If the answer is yes, it is determined whether or not the fuel injection period $T_{OUT}$ calculated is longer than a first predetermined value $T_{OUTIC0}$, at a step 608. This step is for determining whether or not the engine 1 is operating in a predetermined high load condition. If the answer at the step 608 is no, that is, if $T_{OUT} \leq T_{OUTIC0}$, the above step 604 is executed, while if the answer is yes, the program proceeds to the step 623. In this way, when the engine 1 is in a high load condition at a low intake air temperature, the water pump 20 is operated.

If the answer to the question of the step 607 is no, that is, if $T_A \geq T_{AIC1}$, it is determined at a step 609 whether or not the intake air temperature $T_A$ is higher than a second predetermined value (e.g. 90° C.). If the answer is yes, it is determined whether or not the calculated fuel injection preiod $T_{OUT}$ is longer than a second predetermined value $T_{OUTIC4}$, at a step 610. This step is for determining whether or not the engine 1 is in a predetermined middle or high load condition. If the answer at the step 610 is no, that is, if $T_{OUT} \leq T_{OUTIC4}$, the step 604 is executed, while if the answer is yes, the program proceeds to the step 623. In this way, when the engine 1 is operating in a middle or high load condition, the water pump 20 is operated.

If the answer to the question of the step 609 is no, that is, if $T_{AIC1} \leq T_A \leq T_{AIC2}$, it is determined whether or not the engine coolant temperature $T_W$ is lower than a first predetermined value $T_{WIC1}$ (e.g. 20° C.), at a step 611. If the answer is yes, that is, if $T_{WE2} < T_{WIC1}$, an address i corresponding to the detected engine coolant temperature $T_{WE2}$ is set to 1, at a step 612. This address i cooperates with an address j corresponding to the detected engine rotational speed $N_E$ to indicate an address location in a map shown in FIG. 7, in which third injection period values $T_{OUTICij}$ are stored as the fuel injection period $T_{OUT}$ to be set.

If the answer to the question of the step 611 is no, it is determined whether or not the engine coolant temperature $T_{WE2}$ is lower than a second predetermined value $T_{WIC2}$ which is higher than the first predetermined value $T_{WIC1}$, at a step 613. If $T_{WIC1} \leq T_{WE2} \leq T_{WIC2}$, the address i is set to 2, at a step 614, while if $T_{WE2} \geq T_{WIC2}$, the address i is set to 3, at a step 615.

After thus setting of the address i in response to the engine coolant temperature $T_{WE2}$ at the step 612, 614 or 615, setting of the address j is executed at steps 616 to 620, in a manner similar to the setting of the address i described above. Specifically, at the step 616, it is determined whether or not the engine rotational speed $N_E$ is lower than a first predetermined value $N_{EIC1}$ (e.g. 3,500 rpm), and at the step 618 whether or not it is lower than a second predetermined value $N_{EIC2}$ (e.g. 6,000 rpm) higher than $N_{EIC1}$, respectively. If $N_E < N_{EIC1}$, $N_{EIC1} \leq N_E < N_{EIC2}$, and if $N_E \geq N_{EIC2}$, the address j is set to 1, 2, and 3, respectively, at the respective steps 617, 619, and 620.

Next, a third predetermined fuel injection period value TOUTICij of $T_{OUT}$ is read from the map of FIG. 7, which corresponds to the combination of values of the addresses i, j set as above, at a step 621. This third predetermined fuel injection period is set to shorter values as the set value of the address i is larger, that is, as the engine coolant temperature TWE2 is higher.

Then, it is determined at a step 622 whether or not the calculated fuel injection period $T_{OUT}$ is longer than than the read third value $T_{OUTICij}$. If $T_{OUT} \leq T_{OUTICij}$, the above step 604 is executed, whereas if $T_{OUT} > T_{OUTICij}$, the program proceeds to the step 623. The step 623 determines whether or not the battery output voltage $V_B$ is higher than a predetermined value $V_{BIC}$. If the answer is no, the above step 604 is executed, while if the answer is yes, the water pump 20 is operated at a step 624, followed by terminating the program.

By virtue of the above control, the operation and stoppage of the water pump 20 are controlled so that the intake air temperature $T_A$ becomes a suitable value at which overcooling and overheating of the intake air does not take place.

Next reference is made to a method of detecting abnormality in sensors and ECCU 15, as well as fail-safe operations to be effected in the event of abnormality occurring in the sensors, etc.

First, the ECCU 15 determines whether or not the respective output values from the sensors, i.e. engine coolant temperature $T_{WE1}$, turbocharger coolant temperature $T_{WT}$, and lubricating oil temperature $T_{OIL}$ are within respective predetermined ranges within which outputs from the respective sensors can fall when they are normally functioning. If any of these parameter values is found to be out of the predetermined or normal range, the ECCU 15 decides that the corresponding sensor is abnormal, and then sets the detected output value from the sensor to a predetermined fixed value as a substitutive value $T_{WEIFS}$, $T_{WTFS}$, or $T_{OILFS}$. These substitutive values are set at higher values than normal values so that the water pump 20, the radiator fan 27, and the bonnet fan 28 may positively operate. As a result, in the event of failure of any of the sensors, operation of the above components of the cooling device can be ensured, to thereby prevent overheating of the engine system. During operation of the engine 1 in particular, if the radiator fan 27 is stopped, there is a fear that the engine temperature abnormally rises, but the above described control according to the invention will positively prevent such abnormal situations.

The ECCU 15 lights an LED (light emission diode) a number of times corresponding to the sensor which is decided to be abnormal, and at the same time supplies a fail-safe signal to the ECU 9 through the terminal A10.

The ECU 9 operates in response to the fail-safe signal to increase both or either one of the duty ratio $D_2$ for the control valve 75 for introduction of supercharging pressure and the duty ratio $D_1$ for the control valve 77 for introduction of negative pressure, to thereby drive the actuator 71 to reduce the supercharging pressure P2. Thus, overheating of the turbocharger 4 and hence overheating of the engine 1 can be prevented.

Further, in the above case, the ECU 9 resets to a smaller value at least one of the predetermined value $T_{WICH}$ of engine coolant temperature $T_{WE2}$, applied at the step 601, and the first and second predetermined values $T_{WIC1}$ and $T_{WIC2}$ of engine coolant temperature $T_{WE2}$, which are applied respectively at the steps 611 and 613. As will be clear from the control program of FIG. 6 and the map of FIG. 7, as each of these predetermined coolant temperature values is set to a smaller value, the operating range of the water pump 20 is expanded. Therefore, by the above resetting, excessive rises in the temperatures of the turbocharger 4 and the engine 1 can be prevented. Further, the ECU 9, which is originally provided to effect control of fuel injection, etc., also controls the cooling of the engine 1 and the turbocharger 4, which makes it possible to dispense with the need of a special control device for coping with abnormality in the sensor system.

Furthermore, the ECU 9 operates to light an LED provided on the side of the ECU 9 and a warning lamp provided on the instrument panel within the vehicle compartment, thus giving a warning to the driver.

On the other hand, the abnormality in the functioning of the ECCU 15 per se, that is, the failure of the CPU within the ECCU 15 is detected by the aforementioned timer 151. More specifically, the timer counts a predetermined period of time which is longer than a given processing period of time within which the CPU is to complete a predetermined processing, that is, it detects an abnormality if the predetermined period of time counted from the time the CPU started the predetermined processing has elapsed before it completes same. When the timer 151 has counted up, it is decided that there is an abnormality in the CPU per se, and then a predetermined signal is generated to turn the LED on.

The predetermined signal generated as above is supplied to the aforementioned analog circuit 152 connected to the terminals $B_5$ and $B_8$, which circuit in turn generates a low level output and supplies it to the terminal $B_5$ so that the radiator fan 27 is driven thereby to rotate at a high speed, and also generates a high level output and supplies it to the terminal $B_8$ so that the water pump 20 is driven thereby.

In the above described manner, the provision of the analog circuit 152 which can be simple in structure ensures high speed operation of the radiator fan 27 as well as operation of the water pump 20, in the event of failure in the CPU of the ECCU 15, thereby preventing excessive rises in the temperatures of the turbocharger 4 and the engine 1.

According to the above described control applied in the event of abnormality, it is possible to prevent overheating of the engine and the turbocharger and at the same time ensure proper operation of the engine system as well as a long life of same in the event of failure in the sensor system and the control system, without inviting an increase in the cost and designing the systems large in size.

Figure 8:
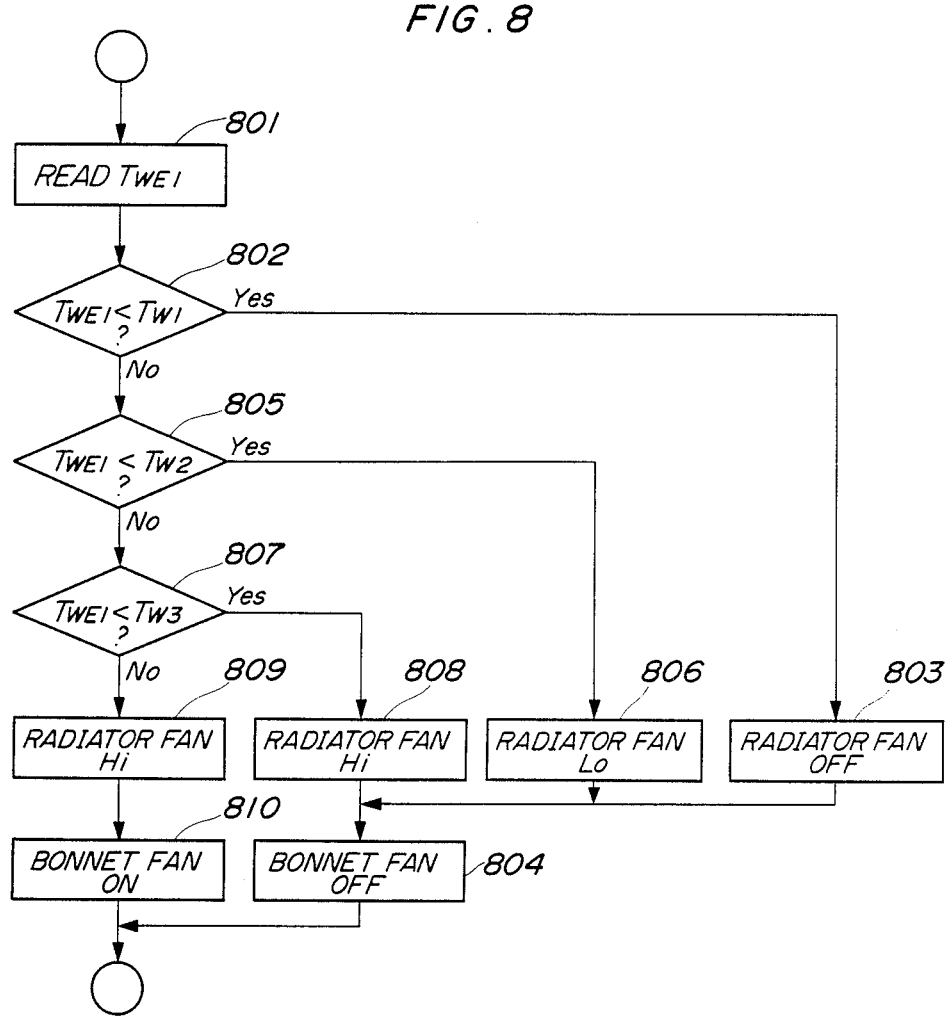
FIG. 8 is a flowchart showing subroutine for controlling the operations of a radiator fan and a bonnet fan of the cooling control system.

FIG. 8 shows a subroutine for controlling the operations of the radiator fan 27 and the bonnet fan 28 during operation of the engine 1. This program is executed by the ECCU 15 at predetermined constant intervals of time while the engine 1 is in operation.

The program of FIG. 8 is for controlling the operation, stoppage, and rotational speed of the radiator fan 27 which cools the engine as well as the operation and stoppage of the bonnet fan 28, in response to change in the temperature of the engine, in other words, controlling the flow rate of cooling air flowing within the engine room in a multi-stepped manner.

First, the actual value of engine coolant temperature $T_{WE1}$ from the $T_{WE1}$ sensor 14 is read at a step 801, and then it is determined whether or not the read $T_{WE1}$ value is lower than a first predetermined value TW1 (e.g. 84° C.), at a step 802. If $T_{WE1} < T_{W1}$, that is, if the engine temperature is low, the radiator fan 27 is stopped (OFF), at a step 803, and at the same time the bonnet fan 28 is also stopped (OFF), at a step 804, followed by terminating the program.

If the answer to the question of the step 802 is no, it is determined at a step 805 whether or not the read engine coolant temperature $T_{WE1}$ is lower than a second predetermined value $T_{W2}$ (e.g. 90° C.) which is higher than the first predetermined value $T_{W1}$, at a step 805. If the answer is yes, that is, if $T_{W1} \leq T_{WE1} \leq T_{W2}$, the radiator fan 27 is controlled to operate at a low (Lo) speed, at a step 806, and then the above step 804 is executed to stop the bonnet fan 28 also in this case, followed by terminating the program.

If the answer to the question of the step 805 is no, it is determined at a step 807 whether or not the engine coolant temperature $T_{WE1}$ is lower than a third predetermined value $T_{W3}$ (e.g. 95° C.) which is higher than the second predetermined value $T_{W2}$. If $T_{W2} \leq T_{WE1} < T_{W3}$, the radiator fan 27 is controlled to operate at a high (Hi) speed, at a step 808, and the above step 804 is executed to stop the bonnet fan 28 also in this case, followed by terminating the program.

If the answer to the question of the step 807 is no, that is, if $T_{WE1} \geq T_{W3}$, which means that the engine temperature is high, the radiator fan 27 is controlled to operate at the high speed, at a step 809, like the step 808, and the bonnet fan 28 is operated (ON), at a step 810, followed by terminating the program.

According to the embodiment described above, the radiator fan 27 and the bonnet fan 28 are so controlled that as the engine temperature is higher, the flow rate of cooling air within the engine room 26 is larger, in a manner accurately corresponding to the engine temperature. Therefore, an appropriate amount of cooling air to the actual engine temperature can be produced within the engine room, thereby enabling to efficiently cool the engine room just to a sufficient level to prevent thermal damage to the engine, and avoid wasteful consumption of the battery.

Although in the embodiment described above the radiator fan 27 and the bonnet fan 28 are controlled during operation of the engine 1, this is not limitative to the invention, but the fans may be operated and controlled over a predetermined period of time after the engine is stopped. That is, in an engine equipped with a turbocharger, the turbocharger continues rotating due to its own inertia even after stoppage of the engine, and consequently the temperature within the engine room can rise abnormally after stoppage of the engine. Therefore, the alternative control is effective to prevent such abnormal temperature rise within the engine room, and hence prevent thermal damage to the turbocharger and the engine.

Further, although in the above described embodiment the engine coolant temperature $T_{WE1}$ is adopted as a parameter for controlling the fans, other temperatures such as the turbocharger-coolant temperature $T_{WT}$ and the lubricating oil temperature $T_{OIL}$ may be adopted, instead of the temperature $T_{WE1}$.

What is claimed is:

1. A cooling control system for controlling cooling of an engine and an engine room, comprising:
   an engine room accommodating and engine;
   cooling means arranged within said engine room for cooling said engine and said engine room, comprising a first cooling fan arranged at a first location within said engine room for cooling said engine, and a second cooling fan arranged at a second location within said engine room, said first cooling fan being capable of being selectively driven for rotation at a predetermined higher speed and at a predetermined lower speed;

driving means for electrically driving said cooling means, comprising first driving means for driving said first cooling fan, and second driving means for driving said second cooling fan;

temperature detecting means for detecting a temperature of said engine; and control means for comparing a value of the temperature of said engine detected by said temperature detecting means with a plurality of different predetermined values, and based upon results of the comparison, controlling said first and second driving means for driving said first and second cooling fans in a manner such that said first cooling fan alone is driven for rotation at said predetermined lower speed when the detected value of the temperature of said engine is above a first predetermined value and below a second predetermined value higher than said first predetermined value, said first cooling fan alone is driven for rotation at said predetermined higher speed when the detected value of the temperature of said engine is above said second predetermined value and below a third predetermined value higher than said second predetermined value, and said first cooling fan is driven for rotation at said predetermined higher speed and at the same time said second cooling fan is driven when the detected value of the temperature of said engine is above said third predetermined value.

2. A cooling control system as claimed in claim 1, wherein said temperature detecting means detects the temperature of coolant in said engine.

3. A cooling control system as claimed in claim 1, wherein said first cooling fan comprises a radiator fan.

4. A cooling control system as claimed in claim 1 or claim 3, wherein said second cooling fan comprises a fan arranged at a rear upper portion of said engine room for introducing fresh air into said engine room from outside.

5. A cooling control system for controlling cooling of an internal combustion engine, comprising:

an internal combustion engine having a turbocharger, an intercooler, and sensor means for detecting operating conditions of said engine;

cooling means for cooling at least one of said turbocharger and said intercooler;

driving means for driving said cooling means; and control means operable when abnormality occurs in said sensor means, for operating said driving means to drive said cooling means, said control means comparing a temperature of said engine with at least one predetermined value, controlling said driving means based upon a result of said comparison, and changing said at least one predetermined value such that said cooling means can operate within an expanded range of said temperature of said engine when abnormality occurs in said sensor means.

6. A cooling control system as claimed in claim 5, wherein said cooling means comprises a pump for supplying coolant to said at least one of said turbocharger and said intercooler, and a radiator fan for cooling said engine, said pump and said radiator fan being both operated by said driving means when abnormality occurs in said sensor means.

7. A cooling control system as claimed in claim 5, wherein said sensor means includes at least one sensor for sensing at least one temperature of said engine.

8. A cooling control system as claimed in claim 7, wherein said control means decides that said at least one sensor is abnormal when a value of said at least one temperature of said engine detected by said at least one sensor falls out of a predetermined range within which outputs from said at least one sensor can fall when it is normally functioning, and then sets the detected value of said at least one temperature to a predetermined fixed value.

9. A cooling control system, as claimed in claim 8, wherein said predetermined fixed value is higher than a normal value and at which said cooling means can be positively operated.

10. A cooling control system for controlling cooling of an internal combustion engine, comprising:

an internal combustion engine having a turbocharger and an intercooler;

cooling means for cooling at least one of said turbocharger and said intercooler;

driving means for driving said cooling means;

control means for controlling said driving means to drive said cooling means; and fail-safe means operable when abnormality occurs in said control means, for operating said driving means to drive said cooling means, said fail-safe means including an analog circuit connected to both said control means and said driving means, and timer means for counting a predetermined period of time which is longer than a period of time within which said control means is to complete a predetermined processing, said timer means generating a signal and supplying same to said analog circuit when counting up said predetermined period of time counted from the time said control means started said predetermined processing, before said control means completes same, said analog circuit being responsive to said signal for causing said driving means to operate said cooling means.

11. A cooling control system as claimed in claim 10, wherein said cooling means comprises a pump for supplying coolant to said at least one of said turbocharger and said intercooler, and a radiator fan for cooling said engine, said analog circuit causing said driving means to operate both said pump and said radiator fan when abnormality occurs in said control means.

* * * * *